July 11, 1961
F. F. HODGE
2,991,651
FLOW RATE INDICATOR
Filed March 17, 1958
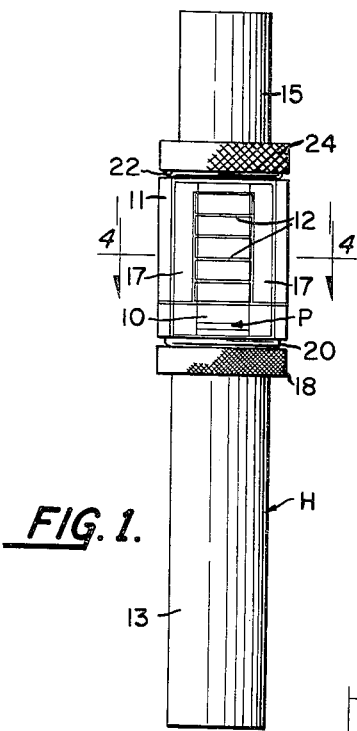
FIG. 1.
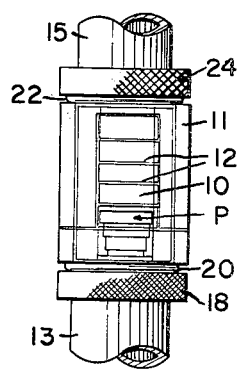
FIG. 2.
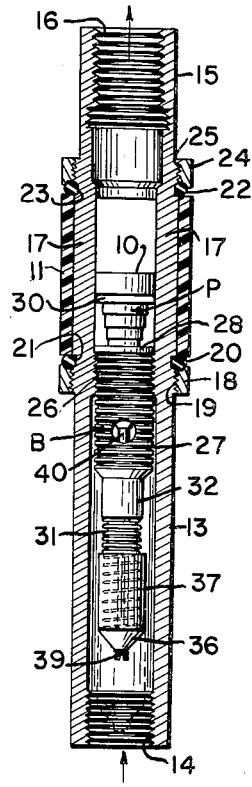
FIG. 3.
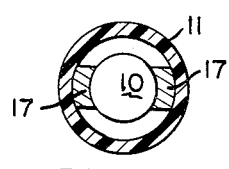
FIG. 4.
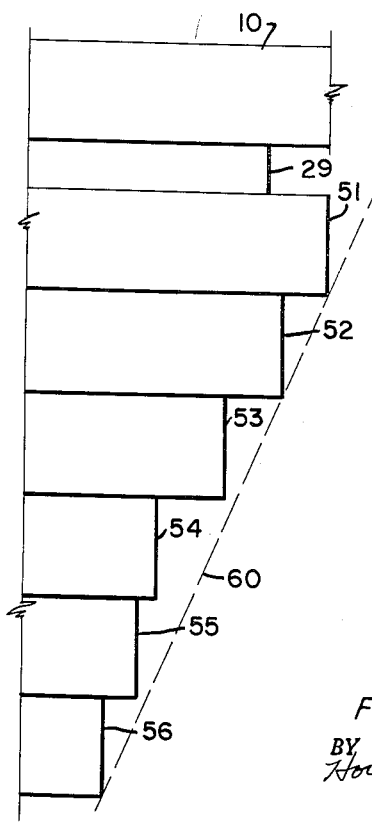
FIG. 6.
FIG. 5.
INVENTOR.
FRED F. HODGE
BY
Horace B. Van Valkenburgh
ATTORNEY

United States Patent Office 2,991,651
Patented July 11, 1961

2,991,651
FLOW RATE INDICATOR
Fred F. Hodge, 1325 W. 10th St., Longmont, Colo.
Filed Mar. 17, 1958, Ser. No. 721,729
6 Claims. (Cl. 73—210)

This invention relates to flow rate indicators, and more particularly to an indicator which will indicate the relative amount or rate of flow of fluid in a conduit or the like.

Flow rate indicators are used primarily for measuring the amount of flow of fluid, one well known type including a rotatable plug normally having a tapered lower end and spiral grooves or flutes along the side to cause a spinning motion to be imparted to the plug. Such plugs may be considered as floats, i.e., they float in the fluid flowing through a vertical tube having a conical wall in which such a plug or float is installed, the tube normally being transparent and graduated so that the position of the float and the consequent rate of flow may be observed. Such flow rate indicators are highly useful as measuring instruments, but ordinarily are considerably less accurate for comparatively low rates of flow than for higher rates and also must be carefully and precisely made, thus being in effect precision instruments and therefore relatively expensive, since not only must the plug be carefully and precisely made, but also the tapering, conical passage in the tube must be formed with precision. Furthermore, other types of indicators and improvements in the above, including those in which an electronic circuit is associated with a plug or the like, not only for indicating, but also for recording purposes, are quite expensive.

In my copending application Serial No. 541,333, filed October 15, 1955, now U.S. Patent No. 2,827,008, there is disclosed and claimed a flow indicator which is adapted primarily to indicate the presence or absence of a minimum flow of fluid and includes, in one form, a passage having a relatively sharp delineation between a flow constriction of lesser and greater diameter, such as at a shoulder, with a ball disposed in a passage above the shoulder. In another form, a plug has a flange disposed against the shoulder in rest position and a cylindrical portion which extends into the passage. It was thought that, by providing in such a construction a conical taper on the plug, in a direction toward the flow of fluid, the movement of the plug due to increase in flow would be proportional to the flow and therefore the device would serve as a flow rate indicator. However, it was found that, for equal amounts of increase in flow, the plug was not moved equal distances and the plug also tended to bob for any steady flow position, the indicator thus being difficult to read.

Among the objects of this invention are to provide a novel flow rate indicator; to provide such a flow rate indicator which is provided with a plug movable in a passage and which will be moved a substantially equal distance for increases in the flow of equal amounts; to provide such a flow rate indicator which will be reliable in operation; and to provide such a flow rate indicator which may be made relatively economically.

Additional objects and the novel features of this invention will become apparent from the description which follows, taken in connection with the accompanying drawing, in which:

FIG. 1 is a side elevation of a flow rate indicator constructed in accordance with this invention;

FIG. 2 is a fragmentary side elevation, similar to FIG. 1, but showing an indicating plug in a different position;

FIG. 3 is a longitudinal section of the flow rate indicator of FIG. 1;

FIG. 4 is a transverse cross section taken along line 4—4 of FIG. 1;

FIG. 5 is a longitudinal section of a plug assembly of the flow rate indicator of FIG. 1; and FIG. 6 is a fragmentary, diagrammatic side elevation, on an enlarged scale, of a plug having a stepped stem, forming a part of the flow rate indicator of FIG. 1.

A flow rate indicator constructed in accordance with this invention, as in FIGS. 1 and 3, may include a hollow housing H within which may be installed a stepped plug P, the head 10 of the plug being movable to different positions in accordance with the flow through the housing, the position of the head 10 of the plug being visible through a transparent sight tube 11 which may be provided with a series of equally spaced graduation marks 12. The marks 12, in accordance with the position of the plug head 10, will indicate the rate of flow of liquid through the housing, it being noted that, in FIG. 1, the upper end of head 10 is in alignment with the lowest mark 12. The housing H may be placed in any desired position, although for convenience it is shown in a vertical position with its inlet at the bottom. A tubular inlet section 13 of the housing H may be provided with internal threads 14 at its outer end for connection to piping which leads to the housing, while a tubular outlet section 15 of the housing may be provided at its outer end with interior threads 16 for connection to the piping which leads from the housing, the flow through the housing being in the direction of the arrows of FIG. 3. The sight tube 11 may be formed of plastic, glass or any other suitable transparent material, while the inlet and outlet sections of the housing may be connected by longitudinal ribs 17, which, as in FIG. 4, may be arcuate on the inside to correspond with the outer diameter of head 10 of plug P and also arcuate on the outside to correspond with the inner diameter of sight tube 11. Graduations 12 may extend completely around sight tube 11, or may be placed on opposite sides thereof and the graduations aligned with the space between the ribs 17. Sight tube 11 may be mounted on the housing in sealing relation in any suitable manner, as by an interiorly threaded collar 18 adapted to engage corresponding threads 19, on the outside of the inner end of the inlet section 13 of the housing, and compress a sealing ring, such as an O-ring 20, against the corresponding end of the sight tube 11. The O-ring 20 is conveniently disposed in a circumferential slot 21, while an O-ring 22 may be disposed in a similar slot 23 and similarly pressed into sealing relation with the opposite end of sight tube 11 by an interiorly threaded collar 24 adapted to engage exterior threads 25 at the inner end of outlet section 15 of the housing. If desired, one of the collars 18 or 24 may be merely a flange on the housing.

Interior threads 26 may be provided at the inner end of inlet section 13 of the housing, as in FIG. 3, for cooperation with exterior threads 27 of a bushing B having a flange 28 at its upper end which provides a seat for the plug P. Immediately below head 10, plug P may be provided with a circumferential groove 29, as in FIG. 5, adapted to receive an O-ring 30 adapted to be held in sealing engagement with the shoulder formed by bushing flange 28, when there is no flow through the housing H, as by a compression spring 31. The spring 31 preferably has sufficient length that it will not be fully compressed when the head 10 of plug P reaches the position of maximum flow for the range desired. Also, due to the O-ring 30, the flow rate indicator of this invention may also be used to prevent back flow in a fluid line. As will be evident, the bushing B provides a passage portion of the lesser cross-sectional area in one direction from the shoulder at flange 28, while the passage portion in the opposite direction from the shoulder has a greater cross-sectional area.

Bushing B, as in FIGS. 3 and 5, may be provided with a reduced lower end 32 having a shoulder 33 providing a seat for one end of spring 31. Plug P may be provided with an axially extending stem 34 having threads at its outer end, as shown, for attachment to a thimble 36 which provides a seat for the opposite end of spring 31, thimble 36 also conveniently being provided with an axially extending, cylindrical flange 37 to guide the spring, while the stem 34 may be locked in the thimble 36 by an axial set screw 39. To permit adequate flow of liquid through plug P, bushing B may be provided with a series of holes 40 in the side wall thereof, it being noted that the inner diameter of inlet section 13, as from threads 26 to or adjacent threads 14, should be sufficient to permit adequate flow of fluid, normally liquid, to the bushing B and through the holes 40. Thus, the inner diameter of section 13 over that range may be greater than shown in FIG. 3, such as by section 13 having a wall thickness of about half of that shown, over the above area. As will be evident, the pressure of liquid within the inlet section 13 of housing H will cause plug P to rise, the sealing ring 30 being forced from its seat on flange 28 of bushing B, while the plug will rise further as the flow increases, such as to or above the position of FIGS. 2 and 3.

In accordance with the present invention and as illustrated diagrammatically in FIG. 6, the plug P is provided with a series of steps 51 to 56, inclusive, which decrease in diameter downwardly in the position shown, from the head 10. It will be noted that FIG. 6 shows only a portion of one side of the plug, with the diameters of the steps 51 to 56 drawn to a scale approximately 25× and the height of the steps drawn to a scale approximately 4×, to bring out more clearly the relationship between the steps and the differences thereof from the dotted cone line 60. As will be evident, all of the steps do not intersect the dotted cone line 60, but certain steps have a lesser diameter than the diameter which would correspond to a true cone, such as the steps 53, 54 and 55. When a plug P was made having a true conical surface, it was found that the plug tended to bob whenever the flow remained steady and also did not move an equal amount for equal increments of increase in the rate of flow of liquid. When equally spaced cylindrical steps, each having a diameter corresponding to intersections with a true conical surface, were placed on the plug, it was found that the plug did not bob when the flow remained steady, as did the plug having a smooth cone-shaped surface, but that equal distances of plug movement did not reflect an equal increase in the amount of flow. In these tests, the line pressure was maintained at 28 lbs. per sq. in., while a flow regulating valve and a displacement meter were utilized in adjusting and measuring the flow, respectively. The results of these tests are shown in Table I below, the positions indicated corresponding to the upper end of plug head 10 reaching successive graduations 12 on the sight tube 11. These graduations were spaced 3/16 in. apart, with the steps also being 3/16 in. long and the diameter thereof as shown. The cone portion of the plug tested had an upper diameter of 0.483 in. and a lower diameter of 0.400 in., being 1 1/8 in. long, the same length as the total length of the steps. The inner diameter of flange 28 of bushing B was 1/2 in., while the spring 31 had an uncompressed length of 2 3/8 in., and an outer diameter of 0.450 in., being formed of stainless steel spring wire of 0.029 in. diameter.

*Table I*

| Position | Stepped Plug Step, Dia. In. | Stepped Plug Flow, Gal./Min. | Cone Plug Flow, Gal./Min. |
| --- | --- | --- | --- |
| 1 | 0.484 | 2.8 | 3.1 |
| 2 | 0.469 | 3.6 | 3.9 |
| 3 | 0.452 | 4.6 | 4.8 |
| 4 | 0.435 | 5.6 | 5.5 |
| 5 | 0.417 | 6.3 | 6.1 |
| 6 | 0.400 | 7.8 | 7.1 |

As will be evident from Table I, the movement of the plug having a cone to the first graduation required a considerably greater flow than the movement of the stepped plug to the first graduation, although in neither case was the difference in flow, between each successive position, the same. Also, the amount of flow for the first position was greater than desired.

In an attempt to provide a flow rate indicator which would permit equally spaced graduations and would indicate the same difference in flow for movement of the plug from one graduation to the next, as well as to permit the movement of the plug to the first graduation to indicate the same initial flow as between successive graduations, further tests were conducted. It was found that if the diameter of the first step were reduced to 0.473 in. and a similar spring 31 having an uncompressed length of 3 1/8 in. rather than 2 3/8 in. was used, the flow at the position of the first graduation would equal one gallon per minute. Then, the diameter of the various steps was changed, as in Table II below, in an attempt to obtain an indication of an increase of flow of one gallon per minute for each graduation.

*Table II*

| Position | Step, Dia. In. | Flow, Gal./Min. |
| --- | --- | --- |
| 1 | 0.473 | 1.0 |
| 1.5 |  | 1.5 |
| 2 | 0.458 | 2.0 |
| 2.5 |  | 2.6 |
| 3 | 0.433 | 3.1 |
| 3.5 |  | 3.8 |
| 4 | 0.414 | 4.2 |
| 4.5 |  | 5.0 |
| 5 | 0.401 | 5.5 |
| 5.5 |  | 6.1 |
| 6 | 0.391 | 6.5 |

In addition, in order to determine whether the flow rate indicator would react accurately at positions between graduations, the flow was measured at positions of the upper end of the plug half-way between each successive pair of graduations, with the results shown. While the results of the test shown in Table II indicated that a much closer approach had been made to the desired results, certain of the step diameters required correction because a greater flow than desired took place when the plug reached a position corresponding to these steps reaching the upper end of the bushing B. By appropriate increase in the diameter of the steps at which it was desired to reduce the flow, the step diameters and flow rates shown in Table III were obtained, it being noted that the step diameters shown in FIG. 6 are based upon Table III.

*Table III*

| Position | Step, Dia. In. | Flow, Gal./Min. |
| --- | --- | --- |
| 1 | 0.474 | 1.0 |
| 1.5 |  | 1.5 |
| 2 | 0.461 | 2.0 |
| 2.5 |  | 2.5 |
| 3 | 0.443 | 3.0 |
| 3.5 |  | 3.5 |
| 4 | 0.423 | 4.0 |
| 4.5 |  | 4.5 |
| 5 | 0.416 | 5.0 |
| 5.5 |  | 5.5 |
| 6 | 0.405 | 6.0 |

As will be evident from Table III, it was possible to construct a stepped plug which would be moved equal distances for equal increases in the rate of flow of the liquid. Also, by increasing the number of steps, the range of the flow rate indicator may be increased. Thus, by adding a seventh step, having a diameter of 0.397 in. to the plug of Table III, the flow when the lower edge of that step reached the upper end of bushing B was 7.0 gal./min.

From the foregoing, it will be evident that a flow rate indicator constructed in accordance with this invention fulfills to a marked degree the requirements and objects hereinbefore set forth. By utilizing a series of steps in a tapered plug, rather than a true conical surface, the bobbing up and down of the cone-shaped plug was avoided, so that more accurate readings could be obtained. Also, by varying the diameter of the steps, so that at least some of the steps have a diameter less than that corresponding to intersection with a true cone, equal increments of movement of the plug could be made to reflect equal increments of increase in flow. The latter permits the plugs to be made with the steps having a specified diameter and the graduation marks on the sight tube thus may be placed equal distances apart, to avoid the necessity of calibrating each individual flow rate indicator. Of course, the increment of increase in flow indicated by movement of a plug from one graduation to the next successive graduation may be varied by changing the spring 31, i.e., an increase in the resistance of the spring to movement of the plug will cause the amount of flow indicated by movement of the plug to increase for each successive graduation, while a decrease in the resistance of the spring will decrease the same. Also, an increase in the uncompressed length of the spring was found to decrease the amount of flow moving the plug to the first graduation. Nevertheless, since springs can be made which are substantially uniform, the only problem involved is the initial selection of a proper spring. Also, by appropriate selection of the inner diameter of the upper end of the bushing B and the diameter of the first step below the head 10 of the plug P, a flow rate indicator can be made so that it will measure accurately various ranges of flow.

The flow rate indicator of this invention is also readily and relatively economically manufactured. The housing H is not required to be made with any high degree of precision, since the only parts which have to be made with accuracy are the steps of the plug P and the inner diameter at the upper end of the bushing B. When contrasted with the precision necessary to grind the taper in a glass or plastic tube, for a flow meter of the type described previously, as well as the necessity for manufacturing the rotatable plug therein with precision, it will be evident that the flow rate indicator of this invention should be much less expensive to manufacture. Since the parts subjected to the passage of liquid may be made of a material which will not corrode, such as brass, the flow rate indicator of this invention may be made so that it will be satisfactory in operation for a long period of time.

Although a preferred embodiment of this invention has been illustrated and described, it will be understood that other embodiments may exist and that various changes may be made therein, without departing from the spirit and scope of this invention.

What is claimed is:

1. A flow rate indicator comprising a housing having a passage therethrough and a fluid inlet and outlet connected with opposite ends of said passage, said passage providing a shoulder between a first portion of greater cross sectional area in the direction of said outlet and a second portion of lesser cross-sectional area in the direction of said inlet; and a plug having a head disposed in said first passage portion and larger than said second passage portion, said head thereby being adapted to seat against said shoulder, said plug having a portion extending longitudinally from said head and into said second passage portion, said extending portion of said plug having a series of steps of a size decreasing in a direction away from said head with at least one intermediate step having a diameter less than that which would intersect a cone extending between the edges of the smallest and largest steps.

2. A flow rate indicator as defined in claim 1, wherein said steps are substantially equally spaced.

3. A flow rate indicator as defined in claim 1, wherein said shoulder is annular and said steps are cylindrical.

4. A flow rate indicator comprising a housing having a passage therethrough and a fluid inlet and outlet connected with opposite ends of said passage, said passage providing an annular shoulder between a first portion of greater cross-sectional area in the direction of said outlet and a second portion of lesser cross-sectional area in the direction of said inlet; a plug having a cylindrical head disposed in said first passage portion and larger than said second passage portion, said plug also having a portion extending into said second passage portion, said extending portion of said plug having a series of cylindrical steps of the same longitudinal extent but of decreasing diameters in a direction away from said head, at least one intermediate step having a size less than that which would intersect a cone extending between the edges of the smallest and largest steps; sealing means mounted on said plug at said head for engagement with said shoulder; and resilient means for urging said plug in a direction to cause said sealing means to engage said shoulder.

5. A flow rate indicator comprising a housing having a tubular fluid inlet section and a tubular fluid outlet section connected by circumferentially spaced, longitudinally extending ribs having arcuate inner and outer surfaces; a transparent cylindrical tube surrounding said ribs and extending between said inlet and outlet sections of said housing; sealing means for the opposite ends of said tube; a tubular bushing having exterior threads, an outwardly extending flange at one end and a reduced portion at the opposite end, the inner end of said inlet section of said housing being provided with cooperating threads for mounting said bushing with said bushing flange in engagement with the inner end of said inlet section and between said ribs, said bushing also having holes in the side wall thereof for flow of fluid to the interior of said bushing; a plug having a cylindrical head and a groove adjacent said head; a sealing ring disposed in said groove for engagement with said bushing flange; said plug also having a series of at least six cylindrical steps of equal length but having successively decreasing diameters in a direction away from said head, at least two intermediate steps having a diameter less than that corresponding to a cone extending between the edges of the smallest and largest steps and each step next adjacent said largest and smallest steps having a diameter more nearly intersecting said cone than each said intermediate step, said steps being disposed in said bushing with said sealing means in engagement with said bushing; said plug also having a stem provided with threads at its outer end and extending longitudinally from the smallest step; a thimble having a threaded central hole for engagement with the threads of said bushing stem, said thimble also having a cylindrical flange surrounding said stem in spaced relation thereto; a coil spring seating at one end in said thimble and at the opposite end against the reduced end of said bushing, the latter having a shoulder against which said spring seats; and said transparent tube having a series of graduations thereon spaced apart longitudinally a distance corresponding to the length of said plug steps.

6. A flow rate indicator comprising a housing having a passage therethrough and a fluid inlet and outlet connected with opposite ends of said passage, said passage providing a shoulder between a first portion of greater cross-sectional area in the direction of said outlet and a second portion of lesser cross-sectional area in the direction of said inlet; and a plug having a head disposed in said first passage portion and larger than said second passage portion, said head thereby being adapted to seat against said shoulder, said plug having a portion extending longitudinally from said head and into said second passage portion, said extending portion of said plug having a series of steps of a size decreasing in a direction away from said head with at least one intermediate step having a size less than that which would intersect a cone extending between the largest and smallest steps and each step next adjacent said largest and smallest steps having a size more nearly approaching a size which would intersect said cone than each intermediate step.

References Cited in the file of this patent

UNITED STATES PATENTS

| | | |
|---|---|---|
| 599,746 | St. John | Mar. 1, 1898 |
| 2,262,807 | Larner | Nov. 18, 1941 |
| 2,567,863 | Varga | Sept. 11, 1951 |
| 2,647,402 | Ibbott | Aug. 4, 1953 |
| 2,805,573 | Emmons | Sept. 10, 1957 |
| 2,827,008 | Hodge | Mar. 18, 1958 |